United States Patent [19]

Gonas

[11] Patent Number: 4,502,181

[45] Date of Patent: Mar. 5, 1985

[54] MOUNT FOR AUTOMOTIVE LOOP STRAP THAT PIVOTS ON HORIZONTAL AXIS

[75] Inventor: Albert J. Gonas, Grosse Pointe, Mich.

[73] Assignee: Voplex Corporation, Pittsford, N.Y.

[21] Appl. No.: 523,934

[22] Filed: Aug. 17, 1983

[51] Int. Cl.³ .................................................. E05B 7/00
[52] U.S. Cl. ........................................ 16/126; 16/378; 16/380; 105/354
[58] Field of Search ...................... 16/110 R, 112, 119, 16/126, 250, 271, 272, 355, 356, 378, 379, 380, 16/386, DIG. 13; 105/354

[56] References Cited

U.S. PATENT DOCUMENTS

| | | | |
|---|---|---|---|
| 1,506,694 | 8/1924 | Toffey . | |
| 1,783,954 | 12/1930 | Broder | 105/354 |
| 2,194,461 | 3/1940 | Lilley | 105/354 |
| 2,646,187 | 7/1953 | Roop . | |
| 2,674,205 | 4/1954 | Claud-Mantle | 105/354 |
| 2,910,260 | 10/1959 | Tanner . | |
| 2,978,736 | 4/1961 | Welker | 16/380 |
| 3,239,237 | 3/1966 | Spencer | 16/126 X |
| 4,064,594 | 12/1977 | Teti, Jr. et al. . | |
| 4,276,676 | 7/1981 | Stolarz . | |
| 4,297,962 | 11/1981 | Johnson, Jr. . | |
| 4,336,631 | 6/1982 | Duff et al. . | |

Primary Examiner—Fred Andrew Silverberg
Attorney, Agent, or Firm—Stonebraker, Shepard & Stephens

[57] ABSTRACT

A mount 10 that allows a loop strap 11 to pivot on a horizontal axis between vertical and horizontal positions uses a fixed pivot pin 15 arranged on the horizontal axis for supporting loop strap 11. A sheet metal sleeve 16 wraps loosely around pivot pin 15 and is secured to the ends 17 and 18 of strap 11 so that strap 11 can pivot on pin 15. A cover 20 is arranged over sleeve 16 and strap ends 17 and 18 and has end openings 21 through which pin 15 can pass. A pair of supports 25 and 26 with blind sockets 30 are pressed onto opposite ends 14 of pivot pin 15 and are made to overlap in a central region behind loop strap 11. Overlapping regions 31 and 32 of end supports 25 and 26 are secured to the vehicle so that strap 11 and cover 20 hang downward to conceal the securing mechanism.

7 Claims, 6 Drawing Figures

U.S. Patent  Mar. 5, 1985  4,502,181
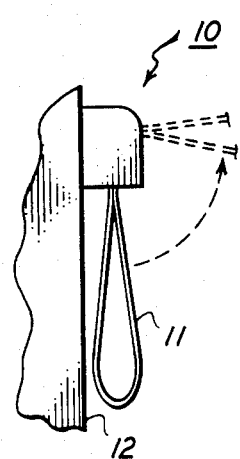
FIG. 1
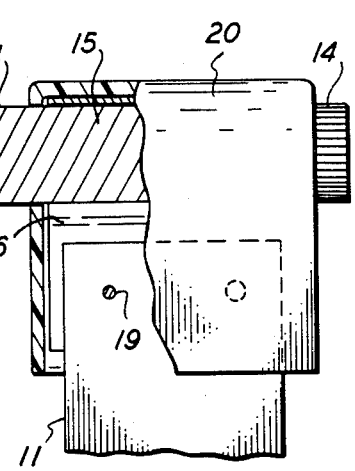
FIG. 2
FIG. 3
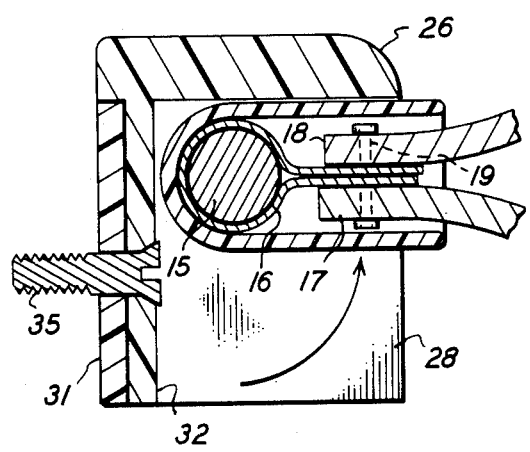
FIG. 4
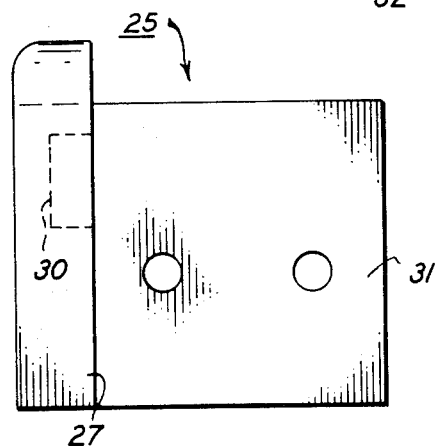
FIG. 5
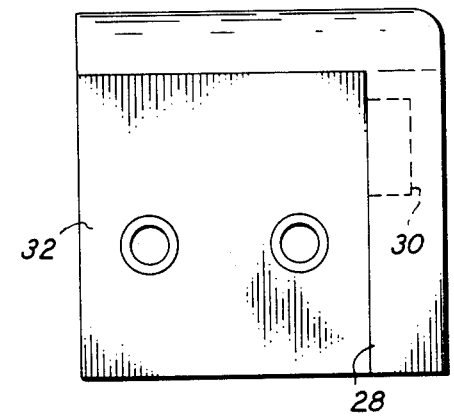
FIG. 6

MOUNT FOR AUTOMOTIVE LOOP STRAP THAT PIVOTS ON HORIZONTAL AXIS

BACKGROUND

Loop straps have been mounted in various ways in automobiles and trucks to serve as passenger assists. I have devised a mount that allows a loop strap to be pivoted up to a horizontal position and pulled on to close a tailgate, hatch, or door and then lets the loop strap hang down in a vertical position when not in use. My mount is also sturdy, economically fabricated and installed and made attractively with functional elements concealed.

SUMMARY OF THE INVENTION

My mount allows a loop strap to pivot on a horizontal axis between vertical and horizontal positions. It includes a fixed pivot pin arranged on the horizontal axis for supporting the loop strap and a metal sleeve formed to wrap loosely around the pivot pin. The ends of the strap are secured to the sleeve, and a cover is arranged to conceal the sleeve and strap ends. A pair of supports are pressed onto opposite ends of the pivot pin and overlap behind the pin. Overlapping regions of the supports are secured to a vehicle. The strap hanging normally downward conceals the fasteners that secure the mount to the vehicle, preferably blind sockets in the supports conceal the pivot pin, the cover over the sleeve and strap ends conceals the sleeve and attaching rivets, and the sleeve and pivot pin provide the necessary durability and freedom of movement to make the strap effective.

DRAWINGS

FIG. 1 is a side elevational view of a preferred embodiment of my loop strap mount;

FIG. 2 is an enlarged and partially cutaway view of the strap ends, sleeve, and cover for the loop strap mount of FIG. 1;

FIG. 3 is a partially cutaway front elevational view of the subassembly of FIG. 2 arranged on a pivot pin;

FIG. 4 is a cross-sectional view of the strap mount of FIG. 1 showing the loop strap raised to a horizontal position and showing an alternative connection between the sleeve and the strap ends; and FIGS. 5 and 6 are elevational views of pin end supports for the mount of FIG. 1.

DETAILED DESCRIPTION

My mount 10 supports a generally known loop strap 11 so that it can hang normally downward in a vertical position when not in use and can be raised to a horizontal position for pulling as shown in FIG. 1. One use for a loop strap on my mount is for closing a tailgate 12 from inside a vehicle. It can also be used for closing doors or hatches. My mount 10 accomplishes the necessary support and motion with durable components that are economically made, assembled, and installed as explained below.

A pivot pin 15 fixed on a horizontal axis supports loop strap 11. A sheet metal sleeve 16 is formed to wrap loosely around pivot pin 15 and interconnect with strap ends 17 and 18. The ends of sleeve 16 can straddle strap ends 17 and 18 as shown in FIG. 2, and a pair of rivets 19 can connect the sleeve and strap ends. An alternative is to arrange the ends of sleeve 16 between strap ends 17 and 18 as shown in FIG. 4, again fastening with rivets 19. Either way, sleeve 16 provides a pivotally loose and long-wearing fit on fixed pin 15 and also provides a secure attachment to strap ends 17 and 18.

A cover 20, preferably injection molded of resin material, is shaped to cover and conceal sleeve 16, strap ends 17 and 18, and rivets 19. Cover 20 preferably slides in a friction fit over sleeve 16 and strap ends 17 and 18. Cover 20 has opposite end holes 21 that are preferably somewhat larger in diameter than pin 15 so that pin 15 can be inserted through sleeve 16 and cover 20 after cover 20 is placed over the strap ends and sleeve. The resulting subassembly is shown in FIG. 3.

A pair of supports 25 and 26 are preferably molded of strong resin or metal material to support pin 15 and provide an anchorage for mounting loop strap 11 on tailgate 12 or other vehicle part. Supports 25 and 26 have respective end regions 27 and 28 each formed with a blind socket 30. The ends 14 of pin 15 are preferably knurled for snugly and immovably seating in sockets 30 when supports 25 and 26 are pressed onto pin ends 14.

Central regions 31 and 32 of supports 25 and 26 overlap when sockets 30 are pressed onto pin ends 14. Overlapping regions 31 and 32 can be spot welded after supports 25 and 26 are pressed onto pin 15, and this can temporarily hold the assembly together until it is mounted on a vehicle.

Mounting is preferably done by a pair of screws 35 that extend through overlapping regions 31 and 32 and fasten to vehicle part 12. Screws 35 thus interconnect end supports 25 and 26 so that pin 15 is securely trapped between end regions 27 and 28. Pin ends 14 are securely lodged in sockets 30 so that pin 15 cannot rotate and is concealed within the mount. Cover 20, sleeve 16, and loop strap 11 are free to pivot between vertical and horizontal in the space between ends regions 27 and 28.

Sleeve 16 affords a durable wearing surface on pin 15 and a secure interconnection with strap 11. Cover 20 conceals the sleeve and rivets and forms an attractive exterior. Cover 20 is trapped in place by encircling pin 15, and screws 35 are hidden behind cover 20 when strap 11 is hanging downward. The result is simple, rugged, low in cost, and effective.

I claim:

1. A mount for a loop strap that pivots on a horizontal axis between vertical and horizontal positions, said mount comprising:
   a. a fixed pivot pin arranged on said horizontal axis for supporting said loop strap;
   b. a metal sleeve formed to wrap loosely around said pivot pin for pivoting said strap on said pin;
   c. means for securing ends of said strap to said sleeve;
   d. a cover arranged over said sleeve and said strap ends to pivot with and conceal said sleeve and said strap ends;
   e. a pair of supports pressed onto opposite ends of said pivot pin and arranged to overlap, wherein each of said supports has a socket to receive an end of said pin; and
   f. means for securing overlapping regions of said supports to a vehicle so that said strap and said cover hang downward to conceal said securing means.

2. The mount of claim 1 wherein said sockets are blind sockets.

3. The mount of claim 2 wherein said ends of said pin are knurled to fix in said sockets.

4. The mount of claim 1 wherein said overlapping regions of said supports extend between said sockets.

5. The mount of claim 4 wherein said strap ends and cover pivot within a space available between said sockets.

6. The mount of claim 1 wherein said supports are molded.

7. The mount of claim 6 wherein said cover is molded of plastic and is press fitted over said sleeve strap ends.

* * * * *